United States Patent
Hill et al.

(10) Patent No.: US 7,341,410 B2
(45) Date of Patent: Mar. 11, 2008

(54) DYNAMICAL INSTRUMENT FOR MACHINING

(75) Inventors: Wayne S. Hill, Westborough, MA (US); Bruce N. Barck, Franklin, MA (US)

(73) Assignee: Foster-Miller, Inc., Waltham, MA (US)

(*) Notice: Subject to any disclaimer, the term of this patent is extended or adjusted under 35 U.S.C. 154(b) by 24 days.

(21) Appl. No.: 10/385,398

(22) Filed: Mar. 10, 2003

(65) Prior Publication Data

US 2004/0179915 A1  Sep. 16, 2004

(51) Int. Cl.
*B23C 3/00* (2006.01)
*G01N 29/14* (2006.01)

(52) U.S. Cl. ............................ 409/234; 73/587

(58) Field of Classification Search ......... 409/234, 409/235; 73/587, 660, 658, 659, 579, 861.04; 700/186, 175, 174
See application file for complete search history.

(56) References Cited

U.S. PATENT DOCUMENTS

| | | | |
|---|---|---|---|
| 4,563,897 A | 1/1986 | Moore | 73/587 |
| 4,656,868 A | 4/1987 | Azuma et al. | 73/587 |
| 4,918,616 A * | 4/1990 | Yoshimura et al. | 73/587 |
| 5,159,836 A * | 11/1992 | Waschkies et al. | 73/587 |
| 5,566,092 A * | 10/1996 | Wang et al. | 700/174 |
| 5,579,232 A * | 11/1996 | Tong et al. | 700/175 |
| 5,600,073 A | 2/1997 | Hill | 73/861.04 |
| 5,618,993 A * | 4/1997 | Matsumoto et al. | 73/587 |
| 5,663,504 A | 9/1997 | Kluft | 73/660 |
| 5,714,691 A | 2/1998 | Hill | 73/861.04 |
| 5,741,980 A | 4/1998 | Hill et al. | 73/861.04 |
| 5,768,137 A * | 6/1998 | Polidoro et al. | 700/186 |
| 6,004,017 A * | 12/1999 | Madhavan | 700/175 |
| 6,499,349 B1 * | 12/2002 | Aronsson | 73/659 |
| 6,725,723 B2 | 4/2004 | Aronsson et al. | 73/659 |

* cited by examiner

*Primary Examiner*—Dana Ross
(74) *Attorney, Agent, or Firm*—Landiorio, Teska & Coleman (57) ABSTRACT

A dynamical instrument for machining comprising a sensor responsive to a non-rotating part of a machine proximate the tool of the machine for outputting a vibration signal, and a processor responsive to the sensor output configured to calculate a plurality of signature quantities which characterize the dynamics of the vibration signal and correlate the signature quantities to detect parameters associated with the operation of the machine.

29 Claims, 9 Drawing Sheets

DYNAMICAL INSTRUMENT FOR MACHINING

RELATED APPLICATIONS

This invention was made with U.S. Government support under Contract No. 50-DKNB-6-90107 and awarded by the Department of Commerce National Institute of Standards and Technology (NIST). The Government may have certain rights in the subject invention.

FIELD OF THE INVENTION

This invention relates generally to machine tools.

COMPUTER PROGRAM LISTING APPENDIX

A computer program listing appendix is filed herewith on compact disk. The material on the compact disk is hereby incorporated by reference. Two identical compact disks have been submitted. Each compact disk contains one file entitled source.txt. The two disks were created on Feb. 28, 2003.

BACKGROUND OF THE INVENTION

Sone machine shops typically operate machines, such as milling machines, lathes, and the like, at reduced rates, typically one-third to one-half the full capacity, in order to avoid breaking the tool when manufacturing an inexpensive part, e.g., the bit may cost fifteen dollars but the part may cost only five dollars.

Other machine shops may manufacture parts which are more expensive, typically costing hundreds or thousands of dollars to manufacture. The parts produced by large machine shops are usually complex and must conform to strict specification requirements provided by the customer. To insure the machined part meets these strict specification requirements, the machine operator typically reduces the rate (e.g., advance speed) of the machine tool in order to increase the accuracy of the cutting bit and to improve the quality of the machined surface of the workpiece. Using conventional machining processes, the operator relies on visual, auditory, and vibration cues to adjust the spindle speed, depth of cut, and rate of advance of the cutting tool to insure a proper surface finish of the workpiece. Post inspection of the workpiece surface finish is required and any deviation from the specification requirements is discovered only after the workpiece is complete and may result in the expensive machined part being scrapped.

Thus, in both types of machine shops, it would be advantageous if the machine operators were provided with real time information concerning the current state of the machine tool (e.g., the remaining tool life, and whether the tool is worn or damaged) because the state of the machine tool directly affects the quality of the surface finish of the workpiece being manufactured and the operating capacity of the machine. Currently, the state of the machine tool is typically determined subjectively by relying on a trained operator's ear, vibration cues and/or shutting the machine down to visually inspect the machine tool.

Other key factors which affect the surface finish of the workpiece include proper coolant/lubricant flow and how well the workpiece is secured in the machine clamp. Similar to the above, machine operators currently rely on visual, auditory and vibration cues to determine proper lubricant flow and the security of the workpiece in the clamp of the machine.

The result is that both types of machine shops lose productivity because they lack real-time feedback instrumentation that characterizes the machining process.

SUMMARY OF THE INVENTION

It is therefore an object of this invention to provide a dynamical instrument for machining.

It is a further object of this invention to provide such a dynamical instrument for machining which provides a real-time measurement of the surface finish of a workpiece in real time as the workpiece is being machined.

It is a further object of this invention to provide such a dynamical instrument for machining which provides a real-time status of the state of a bit as the workpiece is being machined.

It is a further object of this invention to provide such a dynamical instrument for machining which provides a real-time status of the coolant/lubricant.

It is a further object of this invention to provide such a dynamical instrument for machining which increases the operating capacity of the machine while maintaining an accurate surface finish of the workpiece.

It is a further object of this invention to provide such a dynamical instrument for machining which indicates in real-time if the workpiece is properly secured in the machine clamp.

It is a further object of this invention to provide such a dynamical instrument for machining which indicates in real-time if the machine tool is damaged or worn as the workpiece is being machined.

It is a further object of this invention to provide such a dynamical instrument for machining which indicates in real-time the remaining life of a machine tool.

It is a further object of this invention to provide such a dynamical instrument for machining which eliminates the need for post inspection of the workpiece.

This invention results from the realization that a truly effective dynamical instrument for machining can be achieved by the combination of: 1) a sensor responsive to a non-rotating part of the machine, such as a spindle or tool holder, which is located near the bit or tool of the machine and outputs a vibration signal, and 2) a processor, responsive to the sensor output, which calculates a plurality of unique signature quantities to fully characterize the dynamics of the vibration signal and which correlates those signature quantities to detect parameters associated with the operation of the machine, such as the measurement of the surface finish of a workpiece, the state of the machine tool bit, and the status of the cooling/lubrication of the machine.

This invention features a dynamical instrument for machining including a sensor responsive to a non-rotating part of a machine proximate the tool of the machine for outputting a vibration signal, and a processor responsive to the sensor output and configured to calculate a plurality of signature quantities which characterize the dynamics of the vibration signal and correlate the signature quantities to detect parameters associated with the operation of the machine.

In a preferred embodiment the machine may be a lathe. The machine may be a milling machine. The non-rotating part of the machine may be a tool holder. The non-rotating part of the machine may be a spindle assembly. The tool may be a machine bit.

The dynamical instrument for machining may further include a computer subsystem with a device for outputting the detected parameters associated with the operation of the machine. The device for outputting the detected parameters may include an electronic console. The device for outputting the detected parameters may include an auditory device.

The dynamical instrument for machining may further include a signal conditioner circuit for converting and digitizing the vibration signal output by the sensor to obtain a computer code representation of the sensor time series. The detected parameters may include a measurement of the surface finish of a workpiece as the workpiece is machined. The measurement of the surface finish of a workpiece may include the average absolute value deviation in the height from a mean line of the surface finish of the workpiece.

The measurement of the surface finish of a workpiece may include the difference in height between the highest peak above a mean line of the surface finish of the workpiece and the lowest valley below the mean line of the workpiece over a sampling length of the workpiece. The measurement of the surface finish of a workpiece may include the average peak-to-valley height above the mean line of the surface of the workpiece over the sampling length of the workpiece.

The detected parameters may include an indication of the status of lubricant flow in the machine. The detected parameters may include an indication if the machine tool is worn or damaged. The detected parameters may include an indication of the remaining life of the machine tool. The detected parameters may include an indication how secure a workpiece is in a clamp of the machine as the workpiece is being machined.

An electronic console may output a visual display of the detected parameters associated with the operation of the machine. The console may output a visual alarm of the detected parameters associated with the operation of the machine. An auditory device may output an auditory alarm of the detected parameters associated with the operation of the machine.

The sensor may be an accelerometer. The sensor may include a charge amplifier for outputting a signal with reduced influence of external noise. The sensor may be an acoustic sensor. The acoustic sensor may include an amplifier and a narrow band pass filter for outputting a carrier wave with varying amplitude.

Calculating the number of signature quantities may include determining variations in the amplitude of the vibration signal. The processor may further include a neural network trained to correlate the signature quantities to detect parameters associated with the operation of the machine.

A signature quantity may include the average value of the amplitude of the vibration signal. A signature quantity may be the standard deviation of the amplitude of the vibration signal. A signature quantity may include the characteristic auto-correlation time of the vibration signal. A signature quantity may be the average absolute value difference of the amplitude of the vibration signal. A signature quantity may be the average crossing waves variable of the vibration signal. A signature quantity may be the root mean square difference of the average crossing waves variable of the vibration signal. A signature quantity may be the duration of the average crossing waves variable of the vibration signal. A signature quantity may be the root mean square value of the duration of the average crossing waves variable of the vibration signal. A signature quantity may be the period of the standard deviation crossing waves of the vibration signal. A signature quantity may be the duration of crossing waves of the vibration signal. A signature quantity may be the root mean square duration of standard deviation crossing waves of the vibration signal. A signature quantity may be both the average value of the amplitude of the envelope and the standard deviation of the average value of the amplitude of the envelope of the vibration signal.

This invention further features a dynamical instrument for machining including a sensor responsive to a non-rotating part of the machine proximate the tool of the machine for outputting a vibration signal, and a processor responsive to the sensor output for calculating a number of signature quantities which characterize the dynamics of the vibration signal and correlates the signature quantities to detect parameters associated with the operation of the machine, the processor including an output connected to the machine for varying a machine operating parameters.

In one embodiment, the dynamical instrument for machining may further include a controller connected to the output of the processor and the machine for varying the machine operating parameters. The controller may be connected to a motor of the machine.

This invention also features a dynamical method for machining including coupling a sensor to a non-rotating part of a machine proximate the tool of the machine for outputting a vibration signal, and calculating, in response to the vibration signal, a plurality of signature quantities which characterize the dynamics of the vibration signal and correlating the signature quantities to detect parameters associated with the operation of the machine.

In one embodiment the detection of parameters associated with the operation of the machine includes using a neural network trained to calculate the parameters in accordance with the plurality of signature quantities representative of a known parameters associated with the operation of the machine. The parameters may include determining variations in the amplitude of the amplitude envelope of the vibration signal. A signature quantity may be the average value of the amplitude of the vibration signal. A signature quantity may be the standard deviation of the amplitude of the vibration signal. A signature quantity may be the characteristic auto-correlation time of the vibration signal. A signature quantity may be the average absolute value difference of the amplitude of the vibration signal. A signature quantity may be the average crossing waves variable of the vibration signal. A signature quantity may be the root mean square difference of the average crossing waves variable of the vibration signal. A signature quantity may be the duration of the average crossing waves variable of the vibration signal. A signature quantity may be the root means square value of the duration of average crossing waves variable of the vibration signal. A signature quantity may be the period of standard deviation crossings of the vibration signal. A signature quantity may be the root mean square duration of standard deviation crossing waves of the vibration signal. A signature quantity may be the root mean square duration of standard deviation crossing waves of the vibration signal. Signature quantities may be both the average value of the amplitude of the envelope and the standard deviation of the average value of the amplitude of the envelope of the vibration signal.

The method may further include displaying numerical indicators on an electronic console which represent the parameters associated with the operation of the machine. The method may further including displaying sounding an audio alarm to indicate if the parameters associated with the operation of the machine are outside a predetermined range.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

As explained in the Background section above, conventional methods for machining do not provide a machine operator with an objective dynamic measurement of the surface finish of a workpiece as it is being manufactured. Therefore, operators must rely on subjective visual, auditory, and/or vibration cues to adjust spindle speed, depth of cut, and rate of advance of the cutting tool to insure proper surface finish. Conventional methods also do not provide an operator with dynamic information to determine whether a machine tool is worn or damaged, whether proper cooling/lubricant flow is occurring, or how well the workpiece is secured in the machine clamp. Similarly, operators must rely on visual, auditory and vibration cues for these.

Figure 1:
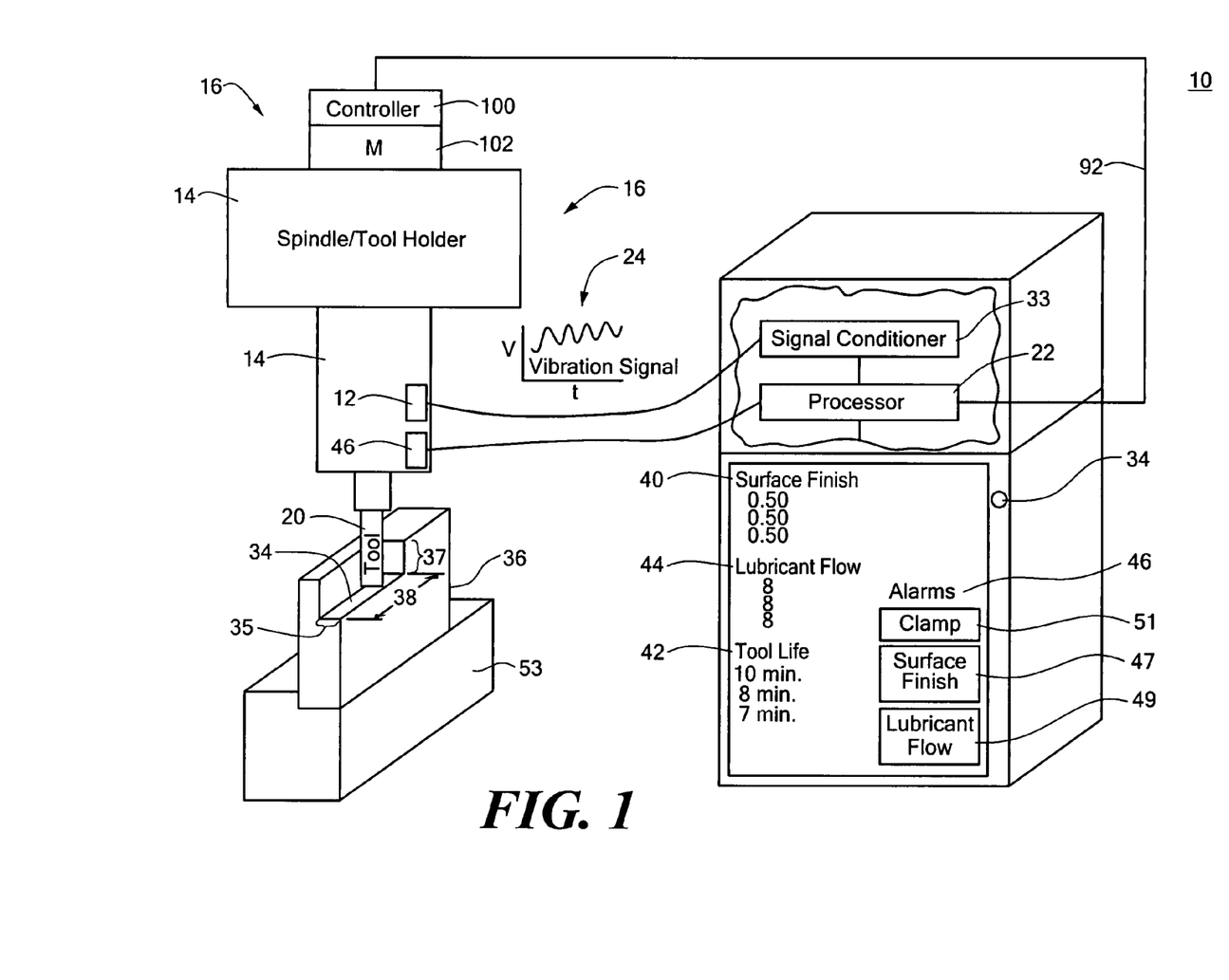
FIG. 1 is a three-dimensional view of one embodiment of the dynamical instrument for machining in accordance with the subject invention.

In contrast, dynamical instrument for machining 10, FIG. 1 of the subject invention includes sensor 12 responsive to non-rotating part 14 (e.g., a spindle or tool holder) of machine 16 proximate tool 20 (e.g., a machine bit) for outputting a vibration signal, such as vibration signal 24. Processor 22 is responsive to the output of sensor 12 and is configured to calculate a plurality of signature quantities which characterize the dynamics of the vibration signal and correlate the signature quantities to detect parameters associated with the operation of the machine, such as the resulting surface finish 34 of workpiece 36, whether machine tool 20 is worn or damaged, and the status of the lubricant/coolant of the machine.

By uniquely calculating a number of signature quantities which characterize the dynamics of the vibration signal and then correlating the signature quantities to detect parameters associated with the operation of the machine, system 10 provides real time detection of surface finish, the state of the machine tool and the status of the lubricant flow. The result is the elimination of a machine operator having to rely on visual, auditory, and/or vibration cues to adjust the spindle speed, depth of cut, and rate of advance of the cutting tool to insure proper surface finish of the workpiece. Instead, the operator or a machine controller is able to make the adjustment based on real-time information provided by system 10. Post inspection of the workpiece can be eliminated. By dynamically providing information about machine tool 20 (e.g., the remaining tool life), the machine operator knows exactly when to shut the machine down and replace the tool allowing the operator to run machine 16 at its full capacity and machine rate resulting in more efficient production of the workpiece.

In one example of this invention, machine 16 is a lathe. In other designs, machine 16 is a milling machine, such as an Enco Model 1005200 knee mill (Enco Manufacturing Co., Chicago, Ill.), 47, FIG. 2. In this example, the spindle speed of milling machine 47 can be adjusted from 215 to 3440 rpm (3.58 to 57.3 Hz) using V-belts and may be employed with three spindle speeds of 860, 1720, and 3440 rpm (14.3, 28.7, and 57.3 Hz). To vary the feed rate, a variable speed drive may be utilized from an Enco Model 205-6404, and modified for use on the Enco Model 1005200 knee mill to provide table at speeds up to approximately 0.44 in/s (11.2 mm/s). Typical milling variables used in accordance with this invention typically include spindle speed, table advance, e.g., feed rate, radial depth of cut, as shown at 35, FIG. 1 of workpiece 36, axial depth of cut, shown at 37, and the stiffness of workpiece 36.

Figure 3A:
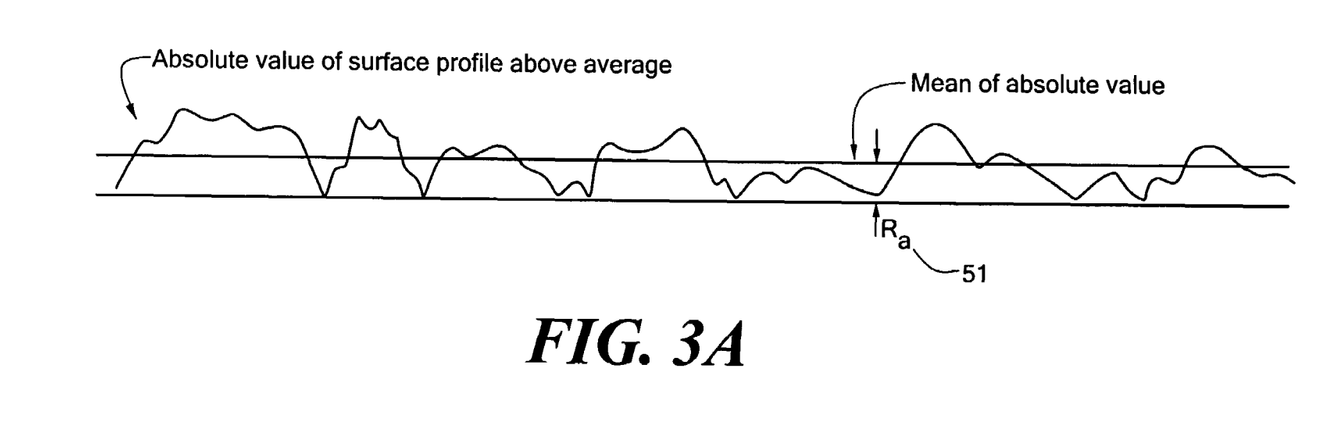
FIGS. 3A-3C are graphs showing examples of various examples of measurements of the surface finish of the workpiece in accordance with this invention.
Figure 3B:
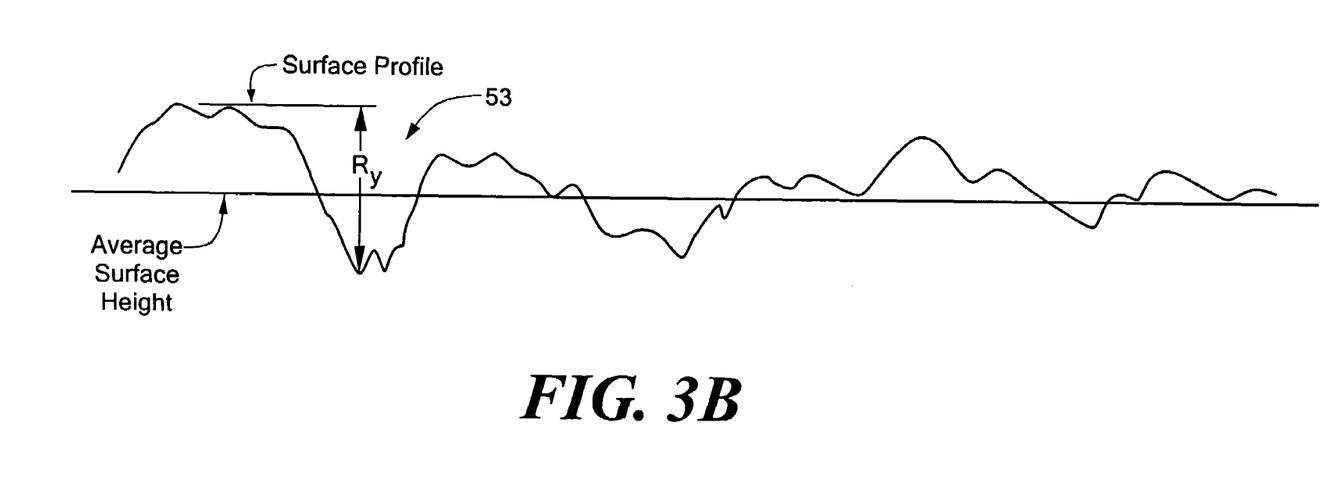
Figure 3C:
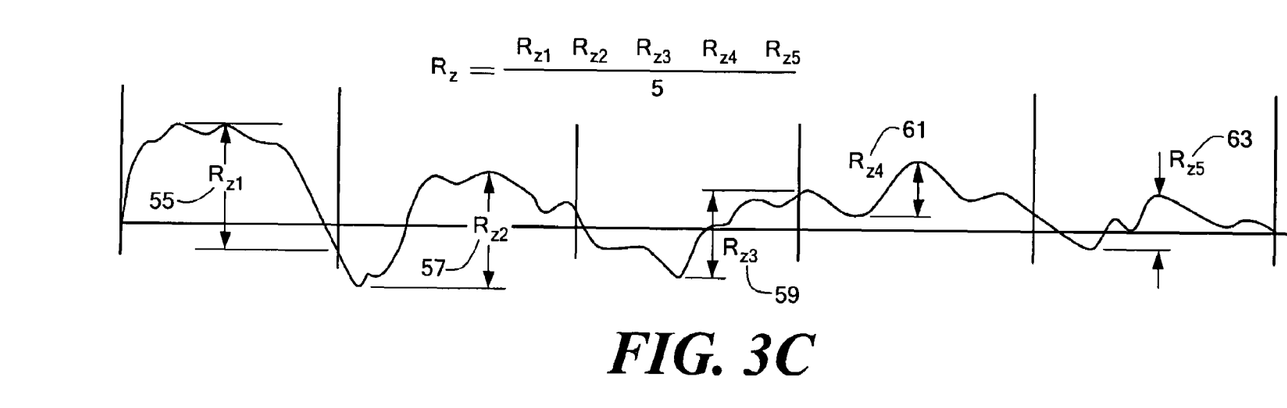

Non-rotating part 14 of machine 16 is typically a tool holder or a spindle assembly. Typically, tool 20 of machine 16 is a machine bit, such as the machine bit indicated at 28, FIG. 3. In this example, the machine bit is a high speed steel end mill and is 0.500 in (12.7 mm) in diameter, includes two helical flutes (with a lead of 2.720 in, 69.09 mm), and may be coated with TiN for wear resistance.

Figure 2:
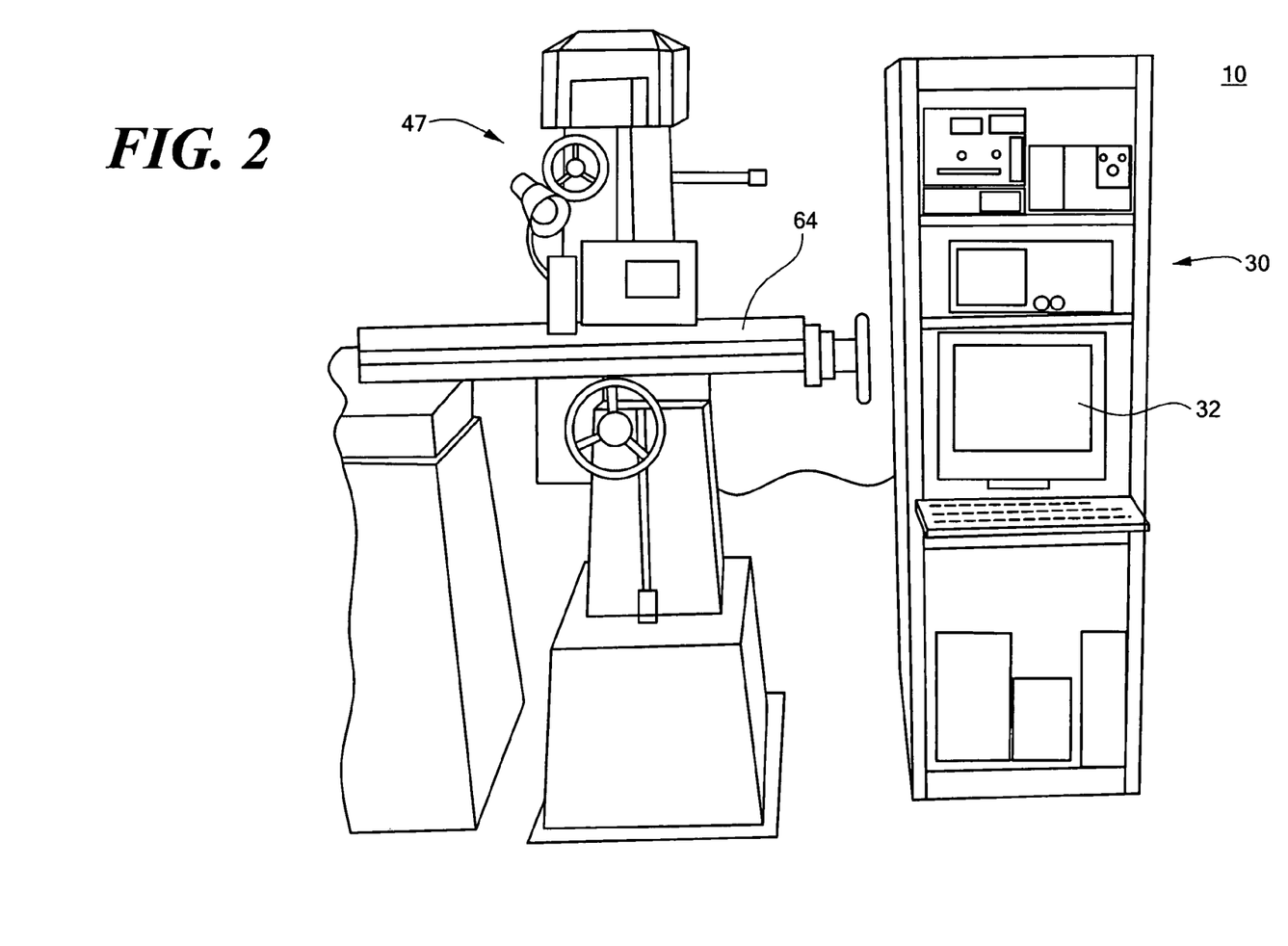
FIG. 2 is a three-dimensional view of the dynamical instrument for machining shown in FIG. 1 employing a milling machine and computer sub-system of this invention.

System 10, FIGS. 1 and 2 may also include computer sub-system 30 with a device, such as electronic console 32 for outputting the detected parameters associated with the operation of machine 16. In one design, the device for outputting the detected parameters may be an auditory device, such as speaker 34, FIG. 1.

Dynamic instrument for machining 10, or system 10, may also include signal conditioner 33 for converting and digitizing the vibration signal (e.g., vibration signal 24) output by sensor 12 into voltage as a function of time. The output from signal conditioner 32 is input to processor 22 which, as shown above, is configured to calculate a plurality of signature quantities which characterize the dynamics of vibration signal and correlate the signature quantities to detect parameters associated with the operation of the machine.

As shown above, system 10 calculates a plurality of signature quantities which characterize the dynamics of the vibration signal and correlates the signature quantities to detect parameters associated with the operation of the machine. The detected parameters associated with the operation of machine 10 may include measurement of surface finish 34 of workpiece 36 as workpiece 36 is machined. The measurement of the surface finish 34 of workpiece 36 may include the average absolute value deviation in height from a mean line of the surface finish 34 of workpiece 36, $R_a$ as indicated at 51, FIG. 3A. In other examples, the measurement of surface finish 34, FIG. 1 of workpiece 36 may include a difference in height between the highest peak above the mean line of surface finish 34 of workpiece 36 and the lowest value below the mean line of workpiece 34 over sampling length 38 of the workpiece 36, $R_y$ indicated at 53, FIG. 3B. In other examples, the measurement of surface finish 34, FIG. 1 of workpiece 36 may include the average peak to valley height above the mean line of the surface of workpiece 36 over sampling length 38 of workpiece 36, $R_z$. $R_z$ is calculated using the formula:

$$R_z = \frac{R_{z1} + R_{z2} + R_{z3} \ldots + R_{zn}}{n} \quad (1)$$

For example, as shown in FIG. 3C, where five surface measurements are taken, e.g., $R_{z1}$, $R_{z2}$, $R_{z3}$, $R_{z4}$ and $R_{z5}$, indicated at 55, 57, 59, 61 and 63, respectively, $R_z$ is calculated as:

$$R_z = \frac{R_{z1} + R_{z2} + R_{z3} + R_{z4} + R_{z5}}{5} \quad (2)$$

Ideally, system 10 displays the detected surface finish measurements on electronic console 32, as indicated at 40, FIG. 1. Other parameters detected and displayed by dynamical instrument for machining 10 associated with the operation of machine 16 include an indication if the machine tool 20 is worn or damaged, displayed on electronic console 32 as remaining life, as shown at 42. The status of the lubricant flow may also be displayed on electronic console 32, as shown at 44. Dynamical instrument for machining 10 may also provide visual alarms 46 on console 32 which may include status of the surface finish alarm 47, the lubricant flow alarm 49, and clamp alarm 51, which indicates if the workpiece 36 is not well secured in a clamp 53.

Visual alarms which indicate the security of the workpiece in the clamp (e.g., clamp alarm 51), the surface finish (e.g., surface finish alarm 47), and the lubricant flow (e.g., lubricant flow alarm 49), in conjunction with auditory alarms (e.g., speaker 34) quickly alert the machine operator to any deviation in the surface finish or malfunctioning of machine 16.

Figure 4:
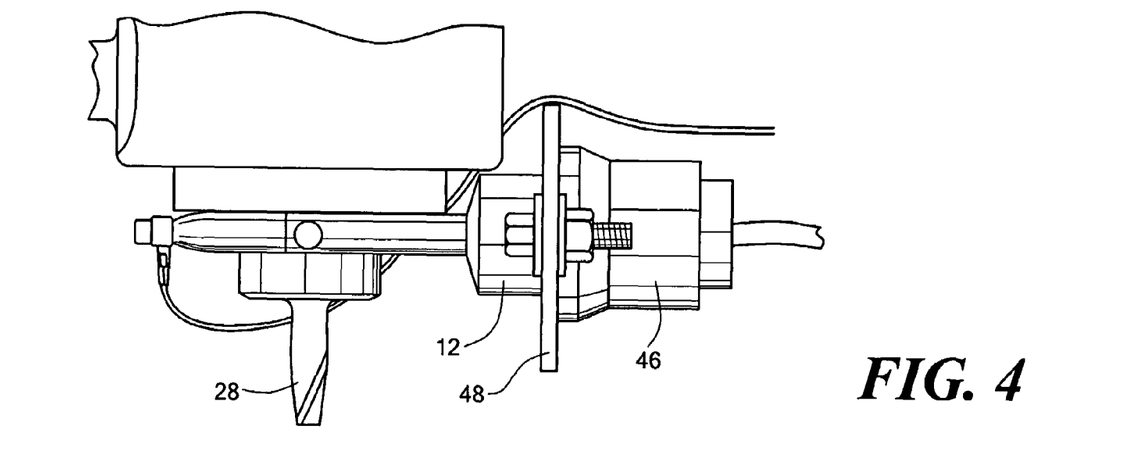
FIG. 4 is a schematic three-dimensional view showing in greater detail examples of the various sensors shown in FIG. 1 mounted on the milling machine shown in FIG. 2.

In one design in accordance with this invention, sensor 12 is an accelerometer, such as an Endevco Model 7259A-25 available from Endevco Corp., San Juan Capistrano, Calif., as shown in detail in FIG. 4. In this embodiment, sensor 12 features a very compact body with a height of only 0.5 inches above the mounting surface and is installed using a mounting stud with a number 10-32 screw thread. Ideally, sensor 12 is unidirectional with sensor 12 sensing direction perpendicular to the mounted surface in a 1.3% maximum off-axis sensitivity. Sensor 12 as employed in this design typically has a high resonant frequency of approximately 93 kHz rendering sensor 12 well suited for dynamic measurement applications. In one example, sensor 12 may include a charge amplifier (not shown) built into the case sensor 12 for reducing external noise. The output from sensor 12 may be amplified to the level required for data acquisition by using a Kistler Model 504E piezoelectric sensor amplifier (Kistler Instrument Corp., Amherst, N.Y.) (not shown) operated in isotron mode. The output range of the sensor amplifier combined with sensor 12 produces an overall output of 0.4734 V/g. The mounting arrangement of sensor 12 mounted on a machine 16 is shown in FIG. 4.

Figure 5:
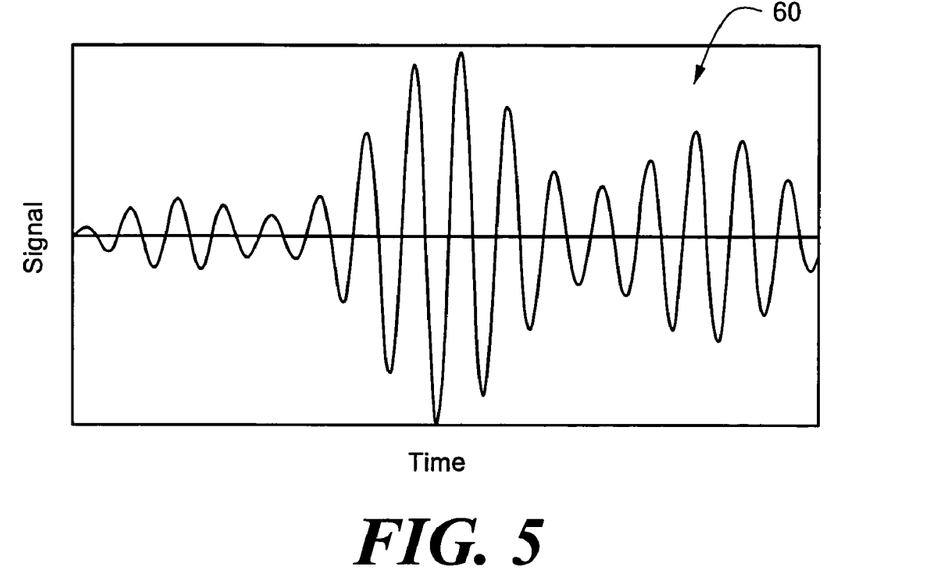
FIG. 5 is a graph showing the typical output from a sensor in accordance with this invention.

System 10, FIG. 1 may also include acoustic sensor 46, such as a ClampOn 2000 manufactured by ClampOn AS of Norway. Sensor 46 is typically mounted to machine 16, such as the Enco Model 1005200 knee mill indicated at 47, FIG. 2, as shown in FIG. 4. Sensor 46 may employ a piezoelectric sensor with a resonant frequency of approximately 83 kHz and may also include a high gain amplifier which ranges from 10 to 66 dB. The amplifier may also incorporate a narrow band pass filter centered at approximately 61 kHz. In operation, the output of sensor 46 may be a 61 kHz carrier wave 60, FIG. 5 with varying (modulated) amplitude. Ideally, a filter centered on the resonant frequency of sensor 46 is used to filter the transient events that inevitably occur during machining (e.g., each tooth strike) and other behaviors, such as noise arising from the sensor (e.g., quantum noise), and surrounding sources, such as motors and fluorescent lighting. As shown in FIG. 4, the sensor head of sensor 46 is designed for use in very rugged working environments. In one example, sensor 46 is housed in a very heavy stainless steel housing approximately 1.9 inches in diameter and 3.7 inches long. Sensor 46 is ideally mounted on the opposite side of collar 48, FIG. 5 of sensor 12.

The collection of dynamic data from sensors 12 and 46 is ideally performed by a computer board, such as a CIO-DAS16/330 Data Acquisition Board (Measurement Computing Corp., Middleboro, Mass.). In one design, the computer board is capable of collecting data at 12-bit resolution for up to 16 single-ended (or 8 double-ended) channels at a total acquisition rate of up to 330 kHz. The computer board is typically operated using a computer program, written in a language such as Visual Basic. In one embodiment, the computer board is operated in a REP INS W (Repeat Instruction Word) mode. Because a high sampling rate is desired in accordance with dynamical instrument for machining 10, a single range is typically selected for all four of the input channels. To collect representative sample of data for each machining condition at the highest possible sampling rate while maintaining a manageable quantity of data to analyze, five seconds of data may be collected for each condition, which corresponds to only 143 tooth strikes at the slowest spindle speed. This results in 1,650,000 samples which when stored in ASCII format would which consume approximately 20 Mb each. In 82 tests over 1.55 Gb of raw data is collected. Even with this high rate of data acquisition, the key dynamic sensors 12 and 46 are recorded at 82.5 kHz, which is insufficient to fully capture the dynamics of the signals. Thus, the subject invention is successful even with undersampled data.

System 10 operates by analysing the vibration signal (e.g., vibration signal 24) provided by sensor 12 and/or sensor 46 and calculating a set of quantities that characterize the dynamics of the vibration signal and correlate the signature quantities to detect parameters associated with the operation of the machine. Calculating the signature quanties includes determining variations in the amplitude of the vibration signal. Some of thes signature quantities are simple and straight forward. Examples include the signal's average value or its standard deviation. Others are more involved, intended to quantify specific aspects of the signal, such as the characteristic sizes, durations, or sequences of behaviors in the signal dynamics. If the data is collected for a sufficient time period, the "undersampled" data stream will capture a representative set of readings. Even though the standard deviation of the sampled data is not equal that of the actual signal, there is a one-to-one relationship between the values found for the sampled data and for the actual signal.

Figure 6:
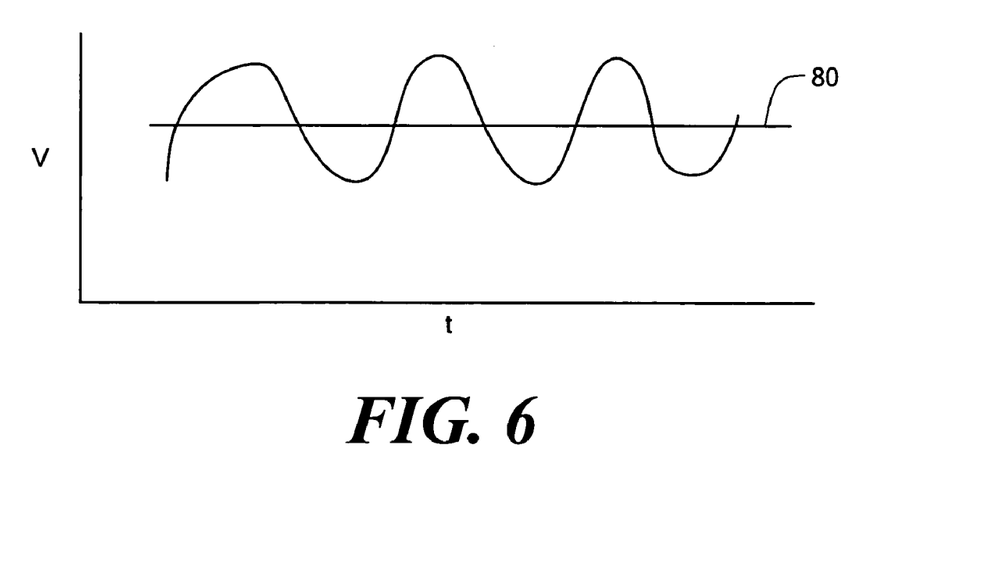
FIG. 6 is a graph depicting one particular signature quantity used to characterize the parameters associated with the operation of the machine in accordance with this invention.

One such signature quantity, (Avg) is the average value of the vibration signal as shown at 80, FIG. 6. Another signature quantity is the standard deviation of the signal (StDev) which reflects the harmonic power of the signal and is an important variable for any irregularly varying signal that carries significant information. A third signature quantity is the characteristic auto-correlation time (Auto). This is the time scale during which the signal loses linear correlation and characterizes the rate of mixing in a process. The auto-correlation quantity is the integral over all time of the signal multiplied times a delayed version of the signal. For long time delays, the auto-correlation approaches:

$$nx^{-2} \qquad (3)$$

where n is the number of readings in the record. For no time delay, the auto-correlation equals:

$$\Sigma x^2 \qquad (4)$$

measured in sampling intervals. The auto-correlation time is:

$$\delta t_{auto} = \frac{\sum x^2 - n\bar{x}^2}{\sum x^2 - \sum x_i x_{i+1}} \qquad (5)$$

A fourth flow indicator quantity is the average difference (Dif), more specifically the average absolute value difference in sequential readings. This flow indicator quantity provides a first order indication of how rapidly the data change on the smallest time scale. It is analogous to the first surface finish parameter, $R_a$, which is a similar measure applied to a surface profile measurement.

A fifth flow indicator quantity is the root mean square difference (RMSDif) in sequential readings, a measure similar to the average difference, but tends to weigh larger changes in sequential readings more strongly than smaller changes.

The remaining flow indicator quantities are calculated by replacing the raw time series data with the moving standard deviation of raw data. That is, the standard deviation of the first twenty readings of the data record is calculated, the window advanced ten readings, and the process repeated until the moving standard deviation of the entire record is calculated. The resulting standard deviation vector characterizes the harmonic power present in the signal as a function of time. Consequently, flow indicator quantities calculated from this vector characterize the variation of harmonic power with time. Such flow indicator quantities are identified by the prefix "Sd".

Figure 7:
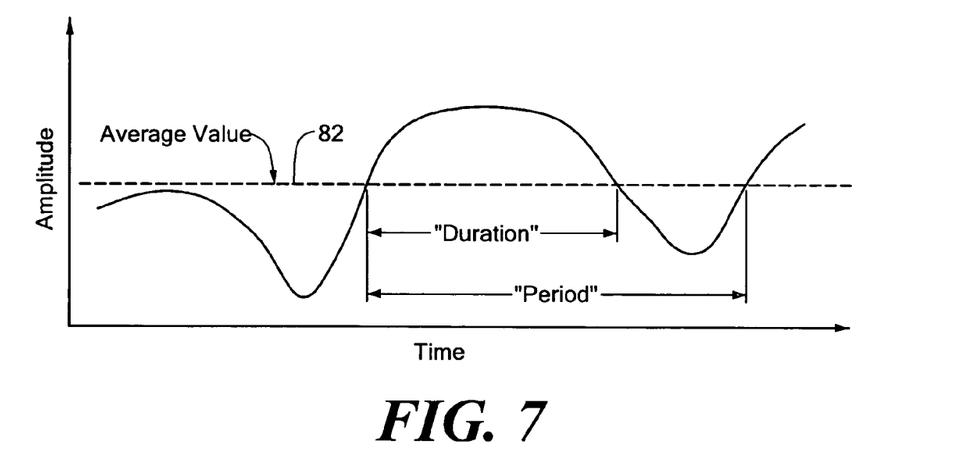
FIG. 7 is a graph depicting another signature quantity used to characterize a flow in accordance with the subject invention.

Another flow indicator quantity is the period of average crossing waves, (SdaPd), which is reflective of the average number of readings that occur between upward crossings of the average value of the amplitude as shown at 82, FIG. 7, and characterized as the time length of first order signal variations.

Another flow indicator quantity, (SdaRMSpd), is the root mean square value of the period of average crossing waves variable which emphasizes longer-period waves. A related flow indicator quantity, (SdaDur), is the duration of average crossing waves which is a measure of the average number of readings that occur between an upward and downward crossing of the average amplitude value as shown at 82, FIG. 7. A related flow indicator quantity is the root mean square value of the duration of average crossing waves, (SdaRMS-Dur).

Figure 8:
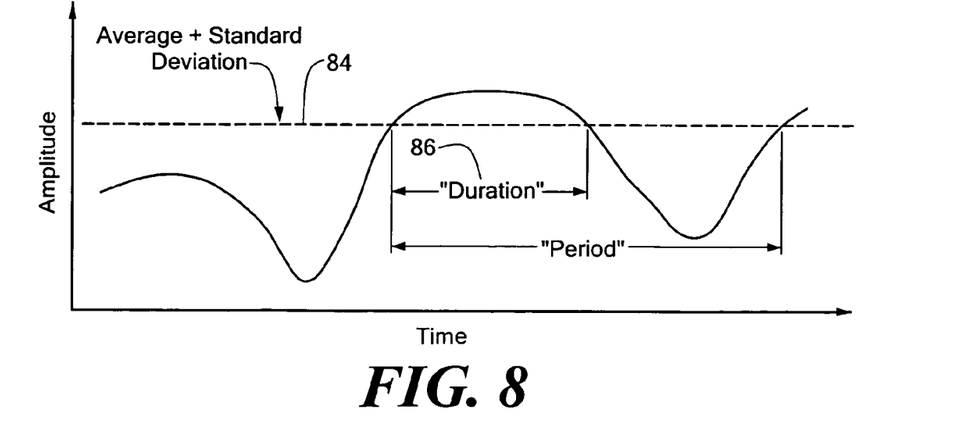
FIG. 8 is a graph depicting another signature quantity used to characterize the parameters associated with the operation of the machine in accordance with this invention.

The period of standard deviation crossing waves flow indicator quantity, (SdsPd), represented in FIG. 8, is a measure similar to the average period of average crossing waves, but in this case the bar is raised somewhat to look at the period of waves that cross the average plus the standard deviation as shown at 84, FIG. 8. A related flow indicator quantity is the root mean square value of the period of standard deviation crossing waves value, (SdsRMSPd). Another flow indicator quantity, (SdsDur), is the duration of standard deviation crossing waves as shown in 86, FIG. 8. Finally, a related flow indicator quantity is the root mean square duration of standard deviation crossing waves, (SdsRMSDur). Other flow indicator quantities, however, are within the scope of this invention.

One version of a Quick Basic 4.5 programming language running under a DOS 2o operating system, operated on computer subsystem 32, FIGS. 1 and 2 for calculating the above signature quantities is provided in the Computer Program Listing Appendix attached hereto. This program accepts a command line in the form: DOC96195[DataFile$] [-1FileList$] n. If analysis of a single data file is of interest, then DataFile$ field above is filled with the path name and file containing the data. If a list of files is to be analyzed, then the minus 1 switch is used and the path and name of the ASCII file containing a list of files used as the FileList$ variable. The command line parameter n was the column number to be analyzed (0 for the accelerometer, 1 for the passive acoustic sensor). In either event, single ASCII output files are created from the DataFile$ or ListFile$, with the name extension replaced with "Oun", where n is the number of the column containing the data that was analyzed. The file contains one row that is a header describing the names of each of the signature quantities calculated, plus one row for each data file that was analyzed containing values corresponding to signature quantities.

Figure 9:
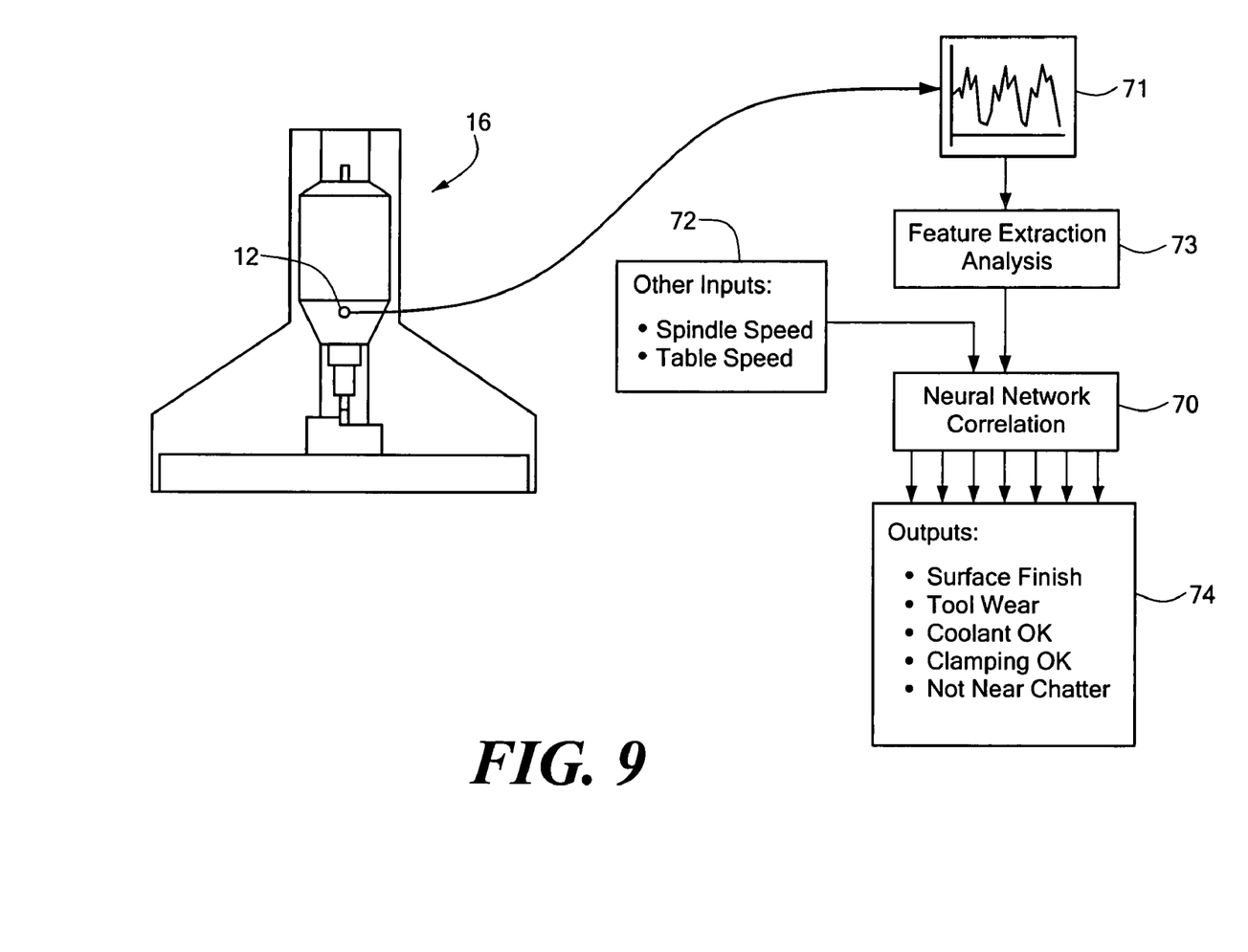
FIG. 9 is a block diagram of the various components of one embodiment of the dynamical instrument for machining of this invention.
Figure 10:
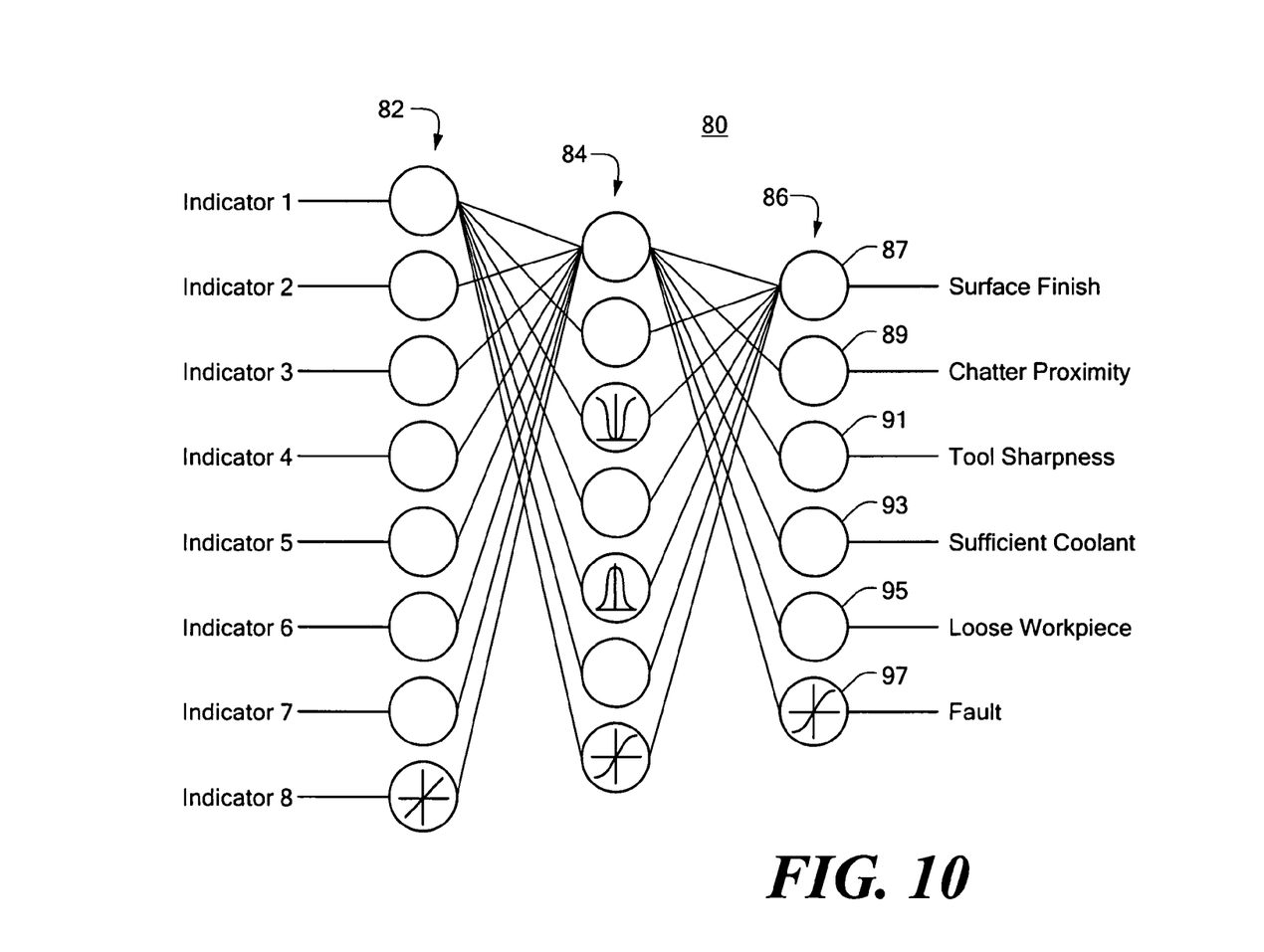
FIG. 10 is a schematic view of a neural network used to detect parameters associated with the operation of the machine in accordance with this invention.

In one embodiment of this invention, the signature quantities are presented to network correlation subsystem 70, FIG. 9 operating on computer subsystem 30, FIG. 2 to provide real time output to electronic console 32. Raw data 71, FIG. 9 from sensor 12 mounted on machine 16 is amplified, digitized and fed into feature extract analysis 73. The set of signature quantities resulting from this analysis, plus other useful settings (such as spindle speed and advance rate, shown at 72, are fed to a neural network correlation 70 network, which determines the surface finish that best matches the dynamics of the data. The surface finish, plus other outputs such as a Tool Wear, Coolant OK, and Clamping OK, as shown at 74, are displayed in real-time to assist the machine operator or machine controller to modify the machining process (e.g., increase or decrease spindle speed, cutting depth, and/or advance rate). Typical inputs from machine 16 may include spindle speed, or table speed, as shown at 72. Neural network 80, FIG. 10 is then used to determine the signature quantities which characterize the dynamics of the vibration signal and correlate the signature quantities to detect parameters associated with the operation of the machine. Neural network 80, FIG. 10 is then used to determine the signature quantities which characterize the dynamics of the vibration signature and correlate the signature quantities to detect parameters associated with the operation of the machine. The primary reason neural network 80 is used is that it has the ability to handle arbitrarily non-linear correlations involving abrupt transitions, strongly varying behaviors, or complicated interactions among input variables. In addition, neural network 80 does not require any assumptions about the form or the correlation between a set of inputs and the desired set of outputs. Neural network 80 is programmed by training a set of weighted connections, rather than by explicitly defining a set of operations that must be performed. Once trained, neural network 80 is then implemented in a very fast, efficient software, firmware, or hardware environment rendering it ideally suited for real time applications. In addition, once properly trained, neural network 80 is extraordinarily fault tolerant, and/or fault indicating. Thus, if the data is noisy or occasionally erroneous or missing, a neural network can indicate this and still provide a reasonable estimate of the operating conditions.

Neural network 80, FIG. 10 is then used to determine the signature quantities which characterize the dynamics of the vibration signature and correlate the signature quantities to detect parameters associated with the operation of the machine. The primary reason neural network 80 is used is that it has the ability to handle arbitrarily non-linear correlations involving abrupt transitions, strongly varying behaviors, or complicated interactions among input variables. In addition, neural network 80 does not require any assumptions about the form or the correlation between a set of inputs and the desired set of outputs. Neural network 80 is programmed by training a set of weighted connections, rather than by explicitly defining a set of operations that must be performed. Once trained, neural network 80 is then implemented in a very fast, efficient software, firmware, or hardware environment rendering it ideally suited for real time applications. In addition, once properly trained, neural network 80 is extraordinarily fault tolerant, and/or fault indicating. Thus, if the data is noisy or occasionally erroneous or missing, a neural network can indicate this and still provide a reasonable estimate of the operating conditions.

In practice, neural network 80 is trained by first inputting known indicator quantities for a broad range of known conditions and training the network to handle those particular cases. Once network 80 is trained, it can be applied to a new set of indicator quantities providing a means of analyzing data in real world applications.

Neural network 80 is best viewed as being made up of a layer of neurons. The most common type of a neural network, called a "back propagation" network, often contains three layers: input layer 82, hidden layer 84, and output layer 86. The input layer receives the input information, in this case the signature quantities discussed above. Each of the inputs is scaled from its full range to a range of (−1, 1) which the network is very good at handling. No processing is done at the input layer, instead, each neuron simply passes along its input value which is fed to the next layer through a set of weighted connections.

Usually, successive layers are thoroughly interconnected so the weighted connections link each neuron in input layer 82 to each neuron in hidden layer 84. The value that reaches a hidden neuron along a given connection is the product of the value injected into the connection by the input neuron and the value of the connection weight. In hidden layer 84, each neuron sums the values that reach it via the connections and then applies a simple, non-linear transformation to that value. Gaussian (bell-shaped) and sigmoidal (S-shaped) functions are the most commonly used, partly because they are easily calculated.

In a preferred embodiment, neural network 80 uses a sigmoidal function called a "logistic" function. This function maps any input value in an infinite range to an output of (−1, 1). The resulting value is then fed forward along the weighted connections to output layer 86. Output layer 86 functions identically to the hidden layer, summing the weighted values that are presented to it, applying a logistic transformation and outputting the result. The output value in the range (−1, 1) is scaled back to the full range of interest, producing a final result of the network, including, in one example, surface finish 87, chatter proximity 89, tool sharpness 91, sufficient coolant 93, loose workpiece 95, and fault 95.

In the subject invention, the eighteen signature quantity inputs are used for each data set and three outputs corresponding to the machine rates or yes/no answers. The number of hidden neurons can vary considerably, depending upon the difficulty of the required calculation. More neurons permit greater complexity, but slow the processing speed. The "NeuroShell 2" neural network simulation program available from Ward Systems Group may be used to implement neural network 80, FIG. 10.

Training back propagation network 80 requires the preparation of a set of training data sets containing both the inputs and the desired outputs. The weighting values initially are selected at random. During training, training cases are chosen at random, presented to the network, and the error in the network's output is "back propagated" through the network to determine minimum changes to the weighted values that will eliminate the error. By performing this process over and over, updating the weighted values as needed, the network's calculation accuracy continually improves until, finally, it is not improved further. If the network's accuracy is acceptable at that point, it can be used as desired to rapidly produce an output value for the set of input values.

Neural network 80 may be subject to "over-training" unless care is taken to train it properly. Over-training is the ability of the network to recognize individual training sets, rather than the basic variation in the patterns between different training sets. Over-trained networks often perform poorly when used to estimate the state of new input sets. This problem can be avoided by using one-sub-set of the available data sets as training data, and the remainder as test data. The network is trained using the training sets, but a new set of values for the connection weights is saved only when it performs better with the test data (which were not used to train the network). This method usually results in a network with satisfactory ability to "generalize" beyond the training data to the larger range of possible inputs.

Each data file of the raw data is filtered into a signature file using the computer program described above. The signature files are merged with a master spreadsheet that contains machining conditions and resulting surface finishes to produce a database that serves as input to neural network 80.

In one example, neural network 80, FIG. 10 is trained using fifty-five training sets and twenty-seven test sets. Training with one set of data and testing with another ensures that neural network 82 is not simply memorizing the data.

Figure 11:
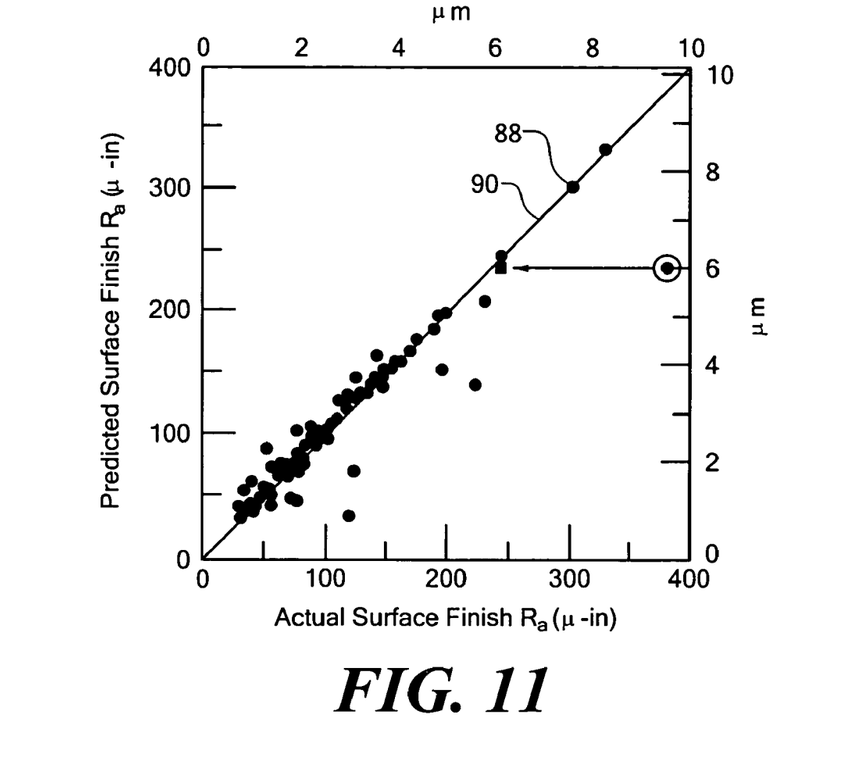
FIG. 11 is a graph depicting the predicted surface finish versus the actual surface finish.

The weakest of three neural network correlations between the inputs accelerometer, e.g., sensor 12, FIG. 1, plus spindle speed and rate of advance, and the output of surface finish, for $R_a$, is illustrated in FIG. 11. As shown in FIG. 11, there is a strong overall correlation for the predicted surface finish provided by dynamical instrument for machining 10 of this invention, with the vast majority of the test conditions clustered near the Y=X line. This indicates that a dynamical instrument for machining 10 of this invention accurately predicts the surface finish of a workpiece.

Neural network 80, FIG. 10 may be trained to employ surface finish parameters $R_a$, $R_y$, and $R_z$ to predict one another as shown in Table 1 below. As shown in Table 1, there is a 1:1 mapping from any measure of surface finish to any other and that the variations in surface finish parameters are inherently linked. Changing one parameter tends to change the others in a predictable fashion with a narrow band of error.

TABLE 1

Relationships between surface finish parameters

| Network Inputs and Outputs | Correlation Coefficient $r^2$ |
|---|---|
| $R_a$ predicts $R_y$ | 0.9564 |
| $R_a$ predicts $R_z$ | 0.9558 |
| $R_y$ predicts $R_a$ | 0.9567 |
| $R_y$ predicts $R_z$ | 0.9644 |
| $R_z$ predicts $R_a$ | 0.9570 |
| $R_z$ predicts $R_y$ | 0.9604 |
| $R_a + R_y$ predict $R_z$ | 0.9647 |
| $R_a + R_z$ predict $R_y$ | 0.9670 |
| $R_y + R_z$ predict $R_a$ | 0.9610 |

In one embodiment of this invention, dynamical instrument for machining 10, FIG. 1 may include controller 100 connected to the output of processor 22 on line 92 for varying machine operating perimeters, such spindle speed, depth of cut, and rate of advance of the cutting tool. In one example, controller 100 is connected to motor 102 for varying the rate of machine 16. In one design, feedback from controller 100 is provided to processor 22.

Figure 12:
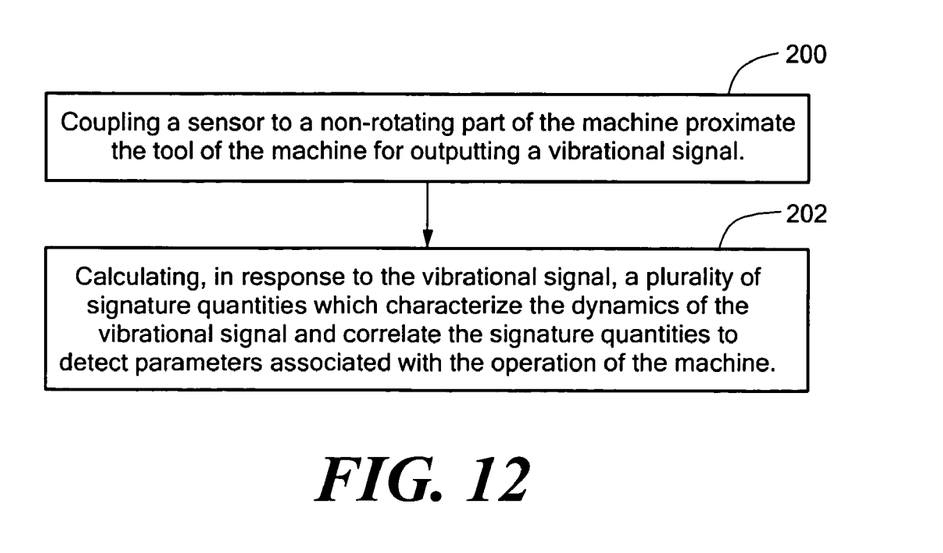
FIG. 12 is a flow chart showing the primary steps of the dynamical method for machining in accordance with the subject invention.

The dynamical method for machining of this invention includes coupling sensor 12, FIG. 1 to non-rotating part 14 of machine 16 proximate tool 20 for outputting vibration signal 24, step 200, FIG. 15, and calculating in response to the vibration signal a plurality of signature quantities which characterize the dynamics of the vibration signal and correlate the signature quantities to detect parameters associated with the operation of machine 16, step 202, FIG. 15. In one design, the dynamical method for machining may further include the step of using a neural network trained to calculate the parameters associated with the operation of the machine in accordance with a plurality of signature quantities representative of known parameters associated with the operation of the machine. Calculating the plurality of signature quantities typically includes determining variations in the amplitude of the vibration signal, e.g., vibration signal 24, FIG. 1. The signature quantities may include the average value of the amplitude, standard deviation of the amplitude, characteristic auto-correlation time, the average difference, more specifically the average absolute value difference in sequential readings, the root mean square difference (RMS-Dif) in sequential readings, the period of average crossing waves variable, (SdaPd), the root mean square value of the period of average crossing waves variable which emphasizes longer-period waves (SdRMSpd), the duration of average crossing waves (SdaDur), the root mean square value of the duration of average crossing waves, (SdaRMSDur), the period of standard deviation crossing waves flow indicator quantity, (SdsPd), the root mean square value of the period of standard deviation crossing waves value, (SdsRMSPd), the duration of standard deviation crossing waves (SdsDur), and the root mean square duration of standard deviation crossing waves, (SdsRMSDur), as discussed in detail above.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A dynamical instrument for machining comprising:
a sensor responsive to a non-rotating part of a machine proximate the tool of the machine for outputting a vibration signal; and
a processor including a neural network having an input layer, a hidden layer, and an output layer responsive to output from the sensor and configured to calculate a plurality of signature quantities which characterize the dynamics of the vibration signal; the neural network is trained to correlate said signature quantities to detect parameters associated with the operation of the machine.

2. The dynamical instrument for machining of claim 1 in which the detected parameters include a measurement of the surface finish of a workpiece as the workpiece is machined.

3. The dynamical instrument for machining of claim 2 in which the measurement of the surface finish of a workpiece includes the average absolute value deviation in the height from a mean line of the surface finish of the workpiece.

4. The dynamical instrument for machining of claim 2 in which the measurement of the surface finish of a workpiece includes the difference in height between the highest peak above a mean line of the surface finish of the workpiece and the lowest valley below the mean line of the workpiece over a sampling length of the workpiece.

5. The dynamical instrument for machining of claim 4 in which the measurement of the surface finish of a workpiece includes the average peak-to-valley height above the mean line of the surface of the workpiece over the sampling length of the workpiece.

6. The dynamical instrument for machining of claim 1 in which the plurality of signature quantities characterize the dynamics of the vibrational signal and correlate the signature quantities to detect an indication of the status of lubricant flow in the machine.

7. The dynamical instrument for machining of claim 1 in which the detected parameters include an indication if the machine tool is worn or damaged.

8. The dynamical instrument for machining of claim 1 in which the detected parameters include an indication of the remaining life of the machine tool.

9. The dynamical instrument for machining of claim 1 in which the detected parameters include an indication how secure a workpiece is in a clamp of the machine as the workpiece is being machined.

10. The dynamical instrument for machining of claim 1 in which said sensor is an accelerometer.

11. The dynamical instrument for machining of claim 1 in which said sensor is an acoustic sensor.

12. The dynamical instrument for machining of claim 10 in which the sensor includes a charge amplifier for outputting a signal with reduced influence of external noise.

13. The dynamical instrument for machining of claim 11 in which the acoustic sensor includes an amplifier and a narrow band pass filter for outputting a carrier wave with varying amplitude.

14. The dynamical instrument for machining of claim 13 in which calculating the number of signature quantities includes determining variations in the amplitude of the vibration signal.

15. The dynamic instrument for machining of claim 14 in which a said signature quantity is the average value of the amplitude of the vibration signal.

16. The dynamical instrument for machining of claim 14 in which a said signature quantity is the standard deviation of the amplitude of the vibration signal.

17. The dynamical instrument for machining of claim 14 in which a said signature quantity is the characteristic auto-correlation time of the vibration signal.

18. The dynamical instrument for machining of claim 14 in which a said signature quantity is the average absolute value difference of the amplitude of the vibration signal.

19. The dynamical instrument for machining of claim 14 in which a said signature quantity is the average crossing waves variable of the vibration signal.

20. The dynamical instrument for machining of claim 19 in which a said signature quantity is the root mean square difference of the average crossing waves variable of the vibration signal.

21. The dynamical instrument for machining of claim 19 in which a said signature quantity is the duration of the average crossing waves variable of the vibration signal.

22. The dynamical instrument for machining of claim 19 in which a said signature quantity is the root mean square value of the duration of the average crossing waves variable of the vibration signal.

23. The dynamical instrument for machining of claim 14 in which a said signature quantity is the period of the standard deviation crossing waves of the vibration signal.

24. The dynamical instrument for machining of claim 23 in which a said signature quantity is the duration of crossing waves of the vibration signal.

25. The dynamical instrument for machining of claim 14 in which a said signature quantity is the root mean square duration of standard deviation crossing waves of the vibration signal.

26. The dynamical instrument for machining of claim 14 in which a said signature quantity is both the average value of the amplitude of the envelope and the standard deviation of the average value of the amplitude of the envelope of the vibration signal.

27. A dynamical instrument for machining comprising:
a sensor responsive to a non-rotating part of the machine proximate the tool of the machine for outputting a vibration signal; and
a processor including a neural network having an input layer, a hidden layer, and an output layer responsive to the sensor output for calculating a number of signature quantities which characterize the dynamics of the vibration signal, the neural network trained to correlate said signature quantities to detect parameters associated with the operation of the machine, and the processor including an output connected to the machine for varying a machine operating parameters.

28. The dynamical instrument for machining of claim 27 further including a controller connected to the output of the processor and the machine for varying the machine operating parameters.

29. The dynamical instrument for machining of claim 28 in which said controller is connected to a motor of the machine.

* * * * *